(12) United States Patent
Hurst

(10) Patent No.: US 8,429,047 B2
(45) Date of Patent: Apr. 23, 2013

(54) SYSTEM AND METHOD FOR MERGING MOBILE GIFT CARDS

(75) Inventor: Douglas J. Hurst, Boulder, CO (US)

(73) Assignee: Mocapay, Inc., Denver, CO (US)

( * ) Notice: Subject to any disclaimer, the term of this patent is extended or adjusted under 35 U.S.C. 154(b) by 619 days.

(21) Appl. No.: 12/629,730

(22) Filed: Dec. 2, 2009

(65) Prior Publication Data

US 2011/0131107 A1    Jun. 2, 2011

(51) Int. Cl.
*G06Q 40/00*     (2012.01)

(52) U.S. Cl.
USPC ............ 705/35; 455/406; 705/30; 705/14.23; 705/17; 705/14.27; 705/16

(58) Field of Classification Search ................ 705/1, 14, 705/39, 30, 44, 14.27, 17, 14.23; 455/406
See application file for complete search history.

(56) References Cited

U.S. PATENT DOCUMENTS

| | | | |
|---|---|---|---|
| 7,657,489 B2 | 2/2010 | Stambaugh | |
| 2008/0052164 A1* | 2/2008 | Abifaker | 705/14 |
| 2008/0208742 A1 | 8/2008 | Arthur et al. | |
| 2009/0032581 A1* | 2/2009 | Esslinger et al. | 235/380 |
| 2009/0171804 A1 | 7/2009 | Lee et al. | |
| 2009/0179074 A1 | 7/2009 | Hurst | |
| 2009/0182663 A1 | 7/2009 | Hurst | |
| 2009/0298481 A1 | 12/2009 | Hurst | |
| 2010/0036524 A1* | 2/2010 | Chirco | 700/237 |
| 2010/0076833 A1* | 3/2010 | Nelsen | 705/14.25 |
| 2010/0325006 A1* | 12/2010 | White | 705/26 |

* cited by examiner

*Primary Examiner* — Tien Nguyen
(74) *Attorney, Agent, or Firm* — Holland & Hart LLP

(57) ABSTRACT

A method and system for merging mobile gift cards is described. One embodiment transmits to a mobile device associated with a user a list of a plurality of mobile gift cards associated with a particular merchant that belong to the user, receives from the user via the mobile device a selection of a particular mobile gift card, receives from the user via the mobile device a selection of one or more other mobile gift cards associated with the particular merchant to be merged with the particular mobile gift card, and moves to the particular mobile gift card the remaining monetary balance of each of the other mobile gift cards selected by the user. In some embodiments, the merging operation is automated in the mobile-commerce platform.

22 Claims, 9 Drawing Sheets

SYSTEM AND METHOD FOR MERGING MOBILE GIFT CARDS

RELATED APPLICATIONS

The present application is related to the following commonly owned and assigned U.S. patent applications: application Ser. No. 12/343,423, entitled "System and Method for Distributing Mobile Gift Cards"; application Ser. No. 12/343/425, entitled "System and Method for Re-Distributing and Transferring Mobile Gift Cards"; and application Ser. No. 12/475,746, entitled "Method and System for Sending Marketing Messages to Mobile-Device Users from a Mobile-Commerce Platform."

FIELD OF THE INVENTION

The present invention relates generally to electronic commerce. More specifically, but not by way of limitation, the present invention relates to systems and methods for merging mobile gift cards.

BACKGROUND OF THE INVENTION

Gift cards have become increasingly popular in recent years, and racks containing gift cards for various merchants are commonplace at grocery stores, convenience stores, street vendors, and other locations. One person pays the merchant (or a distributor marketing gift cards for the merchant) a specified amount of money for the gift card and gives the gift card to another person (the recipient or holder of the gift card) as a gift. The holder of a gift card is then able to purchase, from any merchant associated with that gift card, goods or services costing less than or equal to the monetary value associated with the gift card. Merchants like gift cards because they receive the funds immediately, and the gift-card makes it very likely that the recipient will visit the merchant's store or Web site. Though gift cards have the same value as cash, one disadvantage of conventional gift cards is that the user has to physically present the card to a merchant when using it to make a purchase. This burden is worsened if the card is ever lost because replacement gift cards are generally unavailable.

Attempts have been made to overcome some of the disadvantages of typical plastic, magnetically encoded gift cards. For example, various kinds of electronic gift cards and electronic gift certificates have been developed, but these have their own disadvantages. Specifically, fulfillment can take several days, preventing an electronic-gift-card recipient from making immediate use of the electronic gift card or gift certificate. Also, electronic gift cards stored in the holder's mobile device (e.g., a cellular telephone) make the mobile device an enticing target for theft.

A system and method is thus needed to overcome the inherent limitations of conventional physical and electronic gift cards.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for merging mobile gift cards. One illustrative embodiment is a computer-server-based method for merging mobile gift cards, comprising transmitting to a mobile device associated with a user a list of a plurality of mobile gift cards associated with a particular merchant that belong to the user; receiving from the user via the mobile device a selection of a particular one of the plurality of mobile gift cards associated with the particular merchant; receiving from the user via the mobile device a selection of one or more mobile gift cards in the plurality of mobile gift cards other than the particular one of the plurality of mobile gift cards to merge with the particular one of the plurality of mobile gift cards; and moving a remaining monetary balance of each of the selected one or more mobile gift cards in the plurality of mobile gift cards other than the particular one of the plurality of mobile gift cards to the particular one of the plurality of mobile gift cards; wherein the computer server acts as a server-side wallet for the particular one of the plurality of mobile gift cards, and the particular one of the plurality of mobile gift cards is usable, through interaction with the computer server, by the user for the purchase of goods or services from the particular merchant.

Another embodiment is a computer-server-based method for merging mobile gift cards, comprising ascertaining automatically that a mobile-payments account associated with a user includes a plurality of mobile gift cards associated with a particular merchant; selecting automatically a particular one of the plurality of mobile gift cards associated with the particular merchant; selecting automatically one or more mobile gift cards in the plurality of mobile gift cards other than the particular one of the plurality of mobile gift cards to merge with the particular one of the plurality of mobile gift cards; and moving automatically a remaining monetary balance of each of the selected one or more mobile gift cards in the plurality of mobile gift cards other than the particular one of the plurality of mobile gift cards to the particular one of the plurality of mobile gift cards; wherein the computer server acts as a server-side wallet for the particular one of the plurality of mobile gift cards, and the particular one of the plurality of mobile gift cards is usable, through interaction with the computer server, by the user for the purchase of goods or services from the particular merchant.

Systems that carry out the various methods of the invention are also described. These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying drawings, wherein:

DETAILED DESCRIPTION

In various illustrative embodiments of the invention, the limitations of conventional physical and electronic gift cards are overcome by replacing the physical form factor of a plastic, magnetically encoded gift card with a mobile device such as a cellular telephone in a manner that leaves intact existing gift-card systems and services operated by gift-card service providers such as FIRST DATA and COMDATA.

A mobile-gift-card platform in accordance with these illustrative embodiments provides, among other things, a server-side digital wallet for mobile gift cards that overcomes the shortcomings (e.g., risk of loss or theft) associated with virtual gift cards or gift certificates that reside within the mobile device itself. In these illustrative embodiments, no credentials (account numbers, balances, or other sensitive information) associated with the mobile gift card reside in the mobile device itself. Instead, a secure network infrastructure distributes and manages the mobile gift cards and their associated credentials, the mobile device acting merely as one means for the user to communicate with the server-side digital wallet to access a variety of flexible services surrounding use of the mobile gift cards.

Such flexible services include, without limitation, the ability of a user to view a list of all available mobile gift cards in his or her server-side digital wallet, the ability to view the current balance of any particular mobile gift card, the ability to purchase securely goods or services from the merchant associated with a particular gift card using the mobile device at the point of sale (however, the option to use a physical card is not preempted by the mobile-gift-card platform described herein), the ability to transfer some or all of the balance of a particular mobile gift card to another person, and the ability to merge multiple mobile gift cards associated with a particular merchant into a single mobile gift card associated with that merchant.

Figure 1:
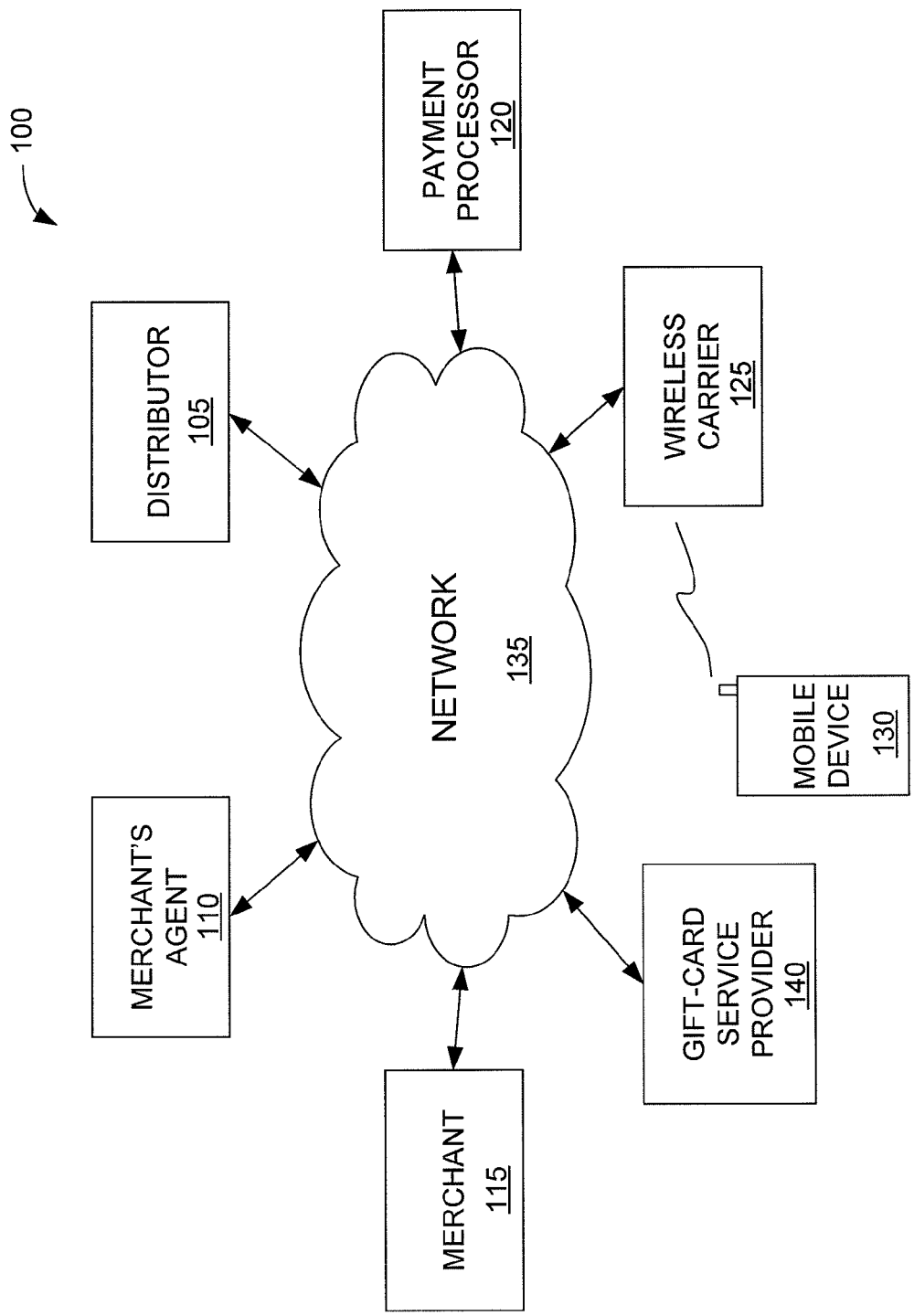
FIG. 1 is a functional block diagram of an environment in which various illustrative embodiments of the invention can be implemented.

Referring now to the drawings, where like or similar elements are designated with identical reference numerals throughout the several views, and referring in particular to FIG. 1, it is a functional block diagram of an environment 100 in which various illustrative embodiments of the invention can be implemented. In environment 100, distributor 105, merchant's agent 110, merchant 115, payment processor 120, wireless carrier 125, and gift-card service provider 140 are able to communicate with one another via network 135. A user's mobile device 130—e.g., a cellular or Personal Communication Service (PCS) phone—is also able to communicate with nodes connected with network 135 via wireless carrier 125. In some embodiments, network 135 includes, but is not necessarily limited to, the Internet.

The environment 100 in FIG. 1 builds on existing gift-card systems operated by gift-card service providers 140 such as, without limitation, FIRST DATA and COMDATA. Gift-card service provider 140, among other things, administers the financial aspects of gift cards, including keeping track of the balance associated with a particular gift card, settlement, reporting to merchants, and other functions.

Merchant 115 sells goods, services, or both and provides mobile gift cards to consumers with the assistance of merchant's agent 110. That is, merchant's agent 110 facilitates the distribution and sale of mobile gift cards issued by merchant 115 by acting as an intermediary between merchant 115 and any of the following: (1) a gift-card service provider 140, (2) mobile-gift-card distributors 105, (3) mobile-gift-card purchasers (those giving the mobile gift cards to others), and (4) mobile-gift-card recipients (consumers who use the mobile gift cards in commerce). A consumer holding such a mobile gift card can use the mobile gift card to purchase goods or services from the particular merchant that issued the mobile gift card, as explained above. How the holder of a mobile gift card uses the mobile gift card to make purchases from the issuing merchant is discussed further below.

Payment processor 120 processes the source of funds for transactions carried out from a user's mobile device such as the user's reloading of a mobile gift card or purchase of a mobile gift card on behalf of someone else. In such transactions, payment processor 120 acts as an agent of the merchant to collect funds from the user's credit card or other payment source. In some embodiments, an entity acting as a payment processor 120 in certain contexts may also be a distributor 105 in other contexts.

Distributor 105 markets mobile gift cards and, in some embodiments, is somewhat analogous to an entity such as grocery store chain SAFEWAY, which markets conventional plastic, magnetically encoded gift cards for a variety of other merchants on racks in its grocery stores with the assistance of a conventional-gift-card merchant's agent such as BLACKHAWK or IDT. Distributor 105 can take on a variety of different forms, depending on the particular embodiment.

In one embodiment, distributor 105 is an entity (not necessarily a merchant) that operates a Web site or other electronic communication channel where mobile gift cards for a number of different merchants are offered in an aggregated fashion. In another embodiment, a single merchant markets its mobile gift cards via remote distribution channels, local distribution channels, or both. For example, a merchant may market its mobile gift cards via a remote distribution channel such as a Web site or other networked electronic communication channel using Application Programming Interfaces (APIs) supplied by merchant's agent 110 or another entity. That is, a merchant may use flexible APIs provided by merchant's agent 110 to customize a Web site or other networked electronic communication channel to offer its mobile gift cards in a manner consistent with the merchant's particular brand identify, logos, etc. A merchant may also employ local distribution methods in a store (at the point of sale). In such an embodiment, the mobile gift card can be "mobilized" (made accessible to the recipient via the recipient's mobile device) at the point of sale.

In yet another embodiment, distributor 105 is a social networking Web site where the interests and preferences of a potential mobile-gift-card recipient are revealed to that person's friends and family. For example, John may discover on the social networking Web site FACEBOOK (www.facebook.com) that his friend Alan likes to shop at BEST BUY, and John can purchase a BEST BUY mobile gift card for Alan at the social networking site. The above are merely a few examples of distributors 105. Mobile gift cards can be marketed in a wide variety of ways and settings.

In an illustrative embodiment, merchant 115 receives the funds from a user's purchase of a mobile gift card minus a predetermined fee that is paid to the merchant's agent 110.

Figure 2:
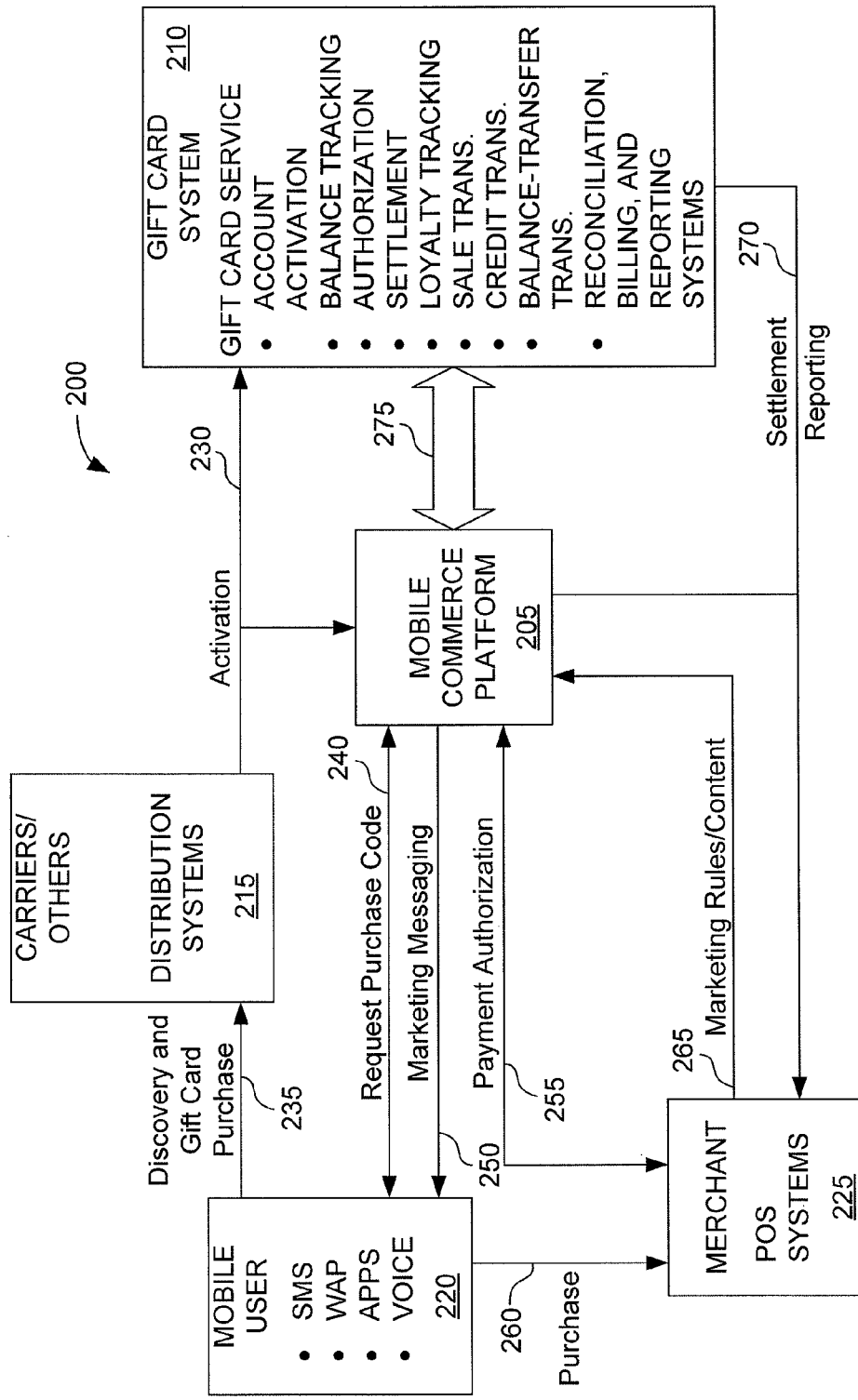
FIG. 2 is a diagram showing interactions among various entities involved in the distribution and use of mobile gift cards, in accordance with an illustrative embodiment of the invention.

FIG. 2 is a diagram showing interactions among various entities 200 involved in the distribution and use of mobile gift cards, in accordance with an illustrative embodiment of the invention. In FIG. 2, gift card system 210 represents a system operated by a conventional gift-card service provider 140 such as, without limitation, FIRST DATA or COMDATA. As indicated in FIG. 2, gift card system 210 provides capabilities such as, without limitation, account activation; balance tracking; authorization; settlement; loyalty tracking; sale transactions; balance-transfer transactions; and reconciliation, billing, and reporting systems.

Various embodiments of the invention preserve the existing payments infrastructure supporting the use of gift cards and overlay them with a mobile commerce platform 205, which is explained below. Other entities involved are a mobile-payments-enabled merchant (sometimes called simply a "merchant" herein) 225, a mobile user 220, and carriers or other entities ("CARRIERS/OTHERS" in FIG. 2) 215 and their associated distribution systems (see distributor 105 in FIG. 1). In the discussion of FIG. 2 below, interactions among these entities are identified by their corresponding reference numerals in parentheses.

In some embodiments, mobile user 220 can use a variety of different access methods such as, without limitation, Short Message Service (SMS) messages, Multimedia Message Service (MMS) messages, Wireless Access Protocol (WAP), an application, or voice to obtain one-use perishable authorization codes (240) from mobile commerce platform 205 in making payments from a variety of different tenders (forms of payment), including mobile gift cards. Mobile user 220 can also use a variety of methods, including the above examples, to provide one-use perishable authorization codes to merchants 225 in making electronic purchases (260). Additional details regarding such mobile-payment technology can be found in U.S. patent application Ser. No. 11/624,620, entitled "Systems and Method for Secure Wireless Payment Transactions," which is incorporated herein by reference in its entirety.

Mobile user 220 may also receive targeted marketing messages (250) before, during, or after a mobile purchase via mobile commerce platform 205 and may purchase (235) mobile gift cards from a carrier 215 (e.g., T-MOBILE, AT&T, VERIZON WIRELESS, etc.) or other distributor 105 such as a social networking Web site. The targeted marketing messages are assisted by the ability of merchant 225 to submit marketing rules, content, or both (265) to mobile commerce platform 205.

Merchant 225 receives payment authorizations (255) from mobile commerce platform 205 in conjunction with the mobile payments technology mentioned above in connection with U.S. patent application Ser. No. 11/624,620. The mobile payments process is summarized briefly below.

Mobile commerce platform 205 facilitates the activation (230) of mobile gift cards sold by a carrier or other entity 215 (or other distributor 105) in cooperation with gift card system 210 via communication link 275. Gift card system 210 also provides, among other things, settlement and reporting services (270) to merchant 225.

When mobile user 220 makes a purchase using a mobile gift card, mobile user 220 contacts mobile commerce platform 205 using any of a variety of access methods (e.g., SMS, MMS, WAP or other browser technology, application, voice) to provide an optional personal identification number (PIN) by which mobile commerce platform 205 authenticates mobile user 220 (240). Mobile commerce platform 205 provides mobile user 220 with one-time perishable (time-limited) authorization codes and balances (240) for various tenders available to that user, including mobile gift cards. In the present example, mobile user 220 selects a specific mobile gift card to be used in making the purchase. The mobile-payments-enabled merchant 225 submits, via its point-of-sale (POS) system, the authorization code provided by mobile user 220 and the transaction amount to mobile commerce platform 205 (255). Mobile commerce platform 205 routes the transaction parameters to gift card system 210, which ensures that the requested amount is available on the indicated mobile gift card. If everything checks out, gift card system 210 informs mobile commerce platform 205, which, in turn, conveys a return authorization to the merchant 225, completing the transaction (255).

With this high-level background in place, the remainder of this Detailed Description focuses primarily on the distribution, transfer, and merging of mobile gift cards.

Figure 3:
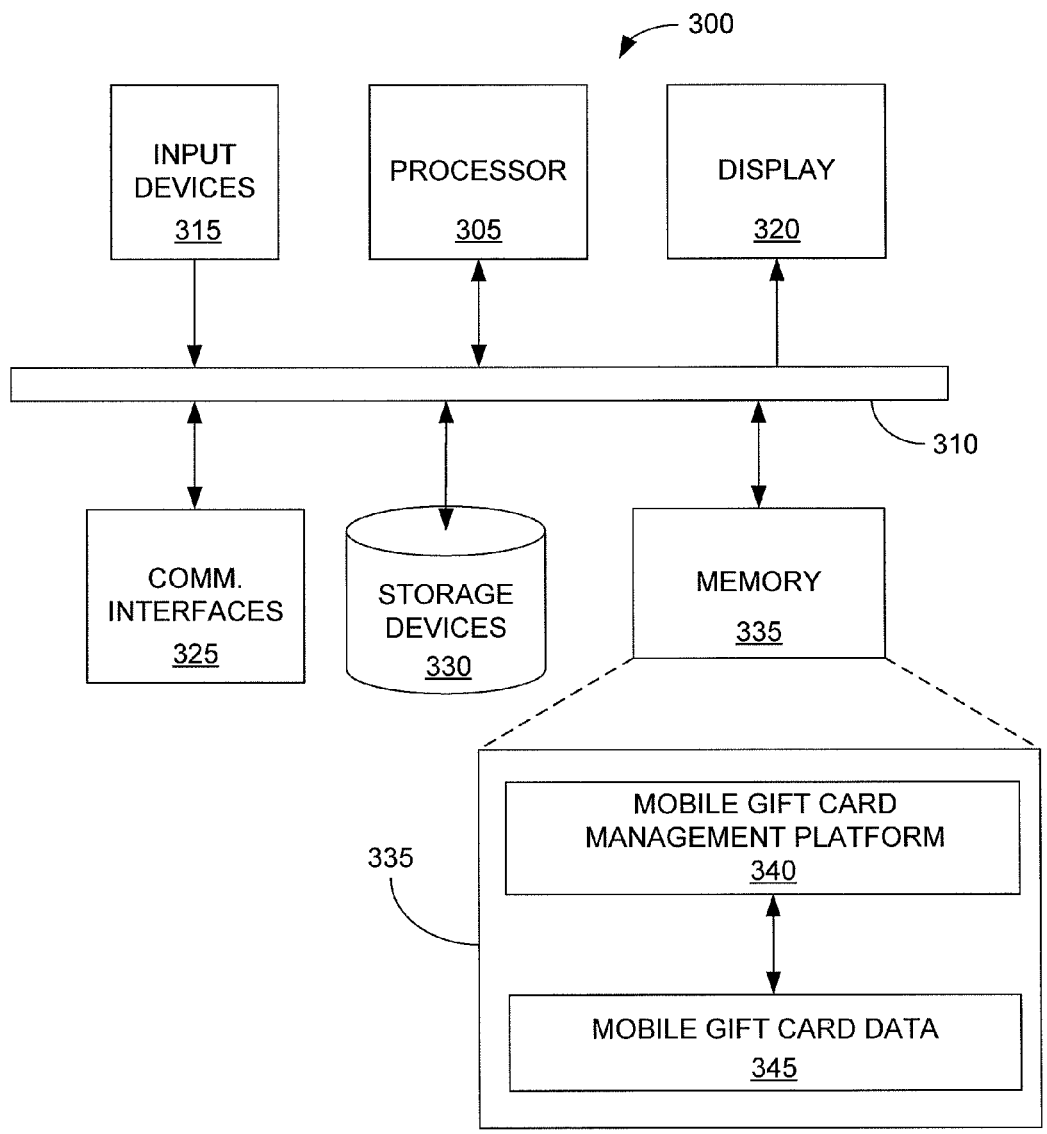
FIG. 3 is a functional block diagram of a server that distributes and manages mobile gift cards in accordance with an illustrative embodiment of the invention.

FIG. 3 is a functional block diagram of a computer server ("server") 300 that distributes and manages mobile gift cards in accordance with an illustrative embodiment of the invention. In this embodiment, server 300 is part of mobile commerce platform 205 (see FIG. 2). In FIG. 3, processor 305 communicates over data bus 310 with input devices 315, display 320, communication interfaces ("COMM. INTERFACES" in FIG. 3) 325, storage devices 330 (e.g., hard disk drives or flash memory), and memory 335. Though FIG. 3 shows only a single processor, multiple processors or a multi-core processor may be present in some embodiments.

Input devices 315 include, for example, a keyboard, a mouse or other pointing device, or other devices that are used to input data or commands to server 300 to control its operation. Communication interfaces 325 may include, for example, various serial or parallel interfaces for communicating with network 135 (see FIG. 1) or one or more peripherals.

Memory 335 may include, without limitation, random access memory (RAM), read-only memory (ROM), flash memory, magnetic storage (e.g., a hard disk drive), optical storage, or a combination of these, depending on the particular embodiment. In FIG. 3, memory 335 includes mobile gift card management platform 340, which distributes and manages mobile gift cards. In doing so, mobile gift card management platform 340 accesses and manipulates mobile gift card data 345, which may reside, at least in part, on storage devices 330.

As mentioned above, mobile gift card management platform 340 implements a server-side digital wallet for the mobile gift card data 345. A "mobile gift card" is, thus, a digital construct (stored digital data) that replaces a physical (e.g., plastic, magnetically encoded) gift card. In this illustrative embodiment, server 300 stores account information for each mobile-gift-card holder. That is, each mobile-gift-card user initially creates an account on server 300. This account information includes, for each mobile gift card belonging to a particular user, (1) the user's mobile phone number, (2) the account number of the particular mobile gift card (analogous to a card number of a physical gift card), and (3) the merchant that issued the mobile gift card. In some embodiments, server 300 stores additional information or different information from that just indicated. Note, however, that, in this particular embodiment, the balance remaining on the mobile gift card is not stored on server 300. Instead, the balance is tracked by the gift-card service provider 140 that operates the applicable gift card system 210. As mentioned above, no credentials associated with a mobile gift card reside on the user's mobile device.

In one illustrative embodiment, mobile gift card management platform 340 is implemented as software that is executed by processor 305. Such software may be stored, prior to its being loaded into RAM for execution by processor 305, on any suitable computer-readable storage medium such as a hard disk drive, an optical disk, or a flash memory. In general, the functionality of server 300 may be implemented using a combination of hardware and software and/or firmware. The methods carried out by mobile gift card management platform 340 are explained more fully below in connection with FIGS. 4-9.

A typical application for mobile gift cards is a situation in which User A wishes to give User B a gift card (e.g., User B has a birthday coming up). From a user perspective, User A can communicate with server 300 of mobile commerce platform 205 in a variety of different ways to purchase a mobile gift card for User B. Examples include, without limitation, a Web site hosted by server 300 (or another server elsewhere on the network) and visited by User A using a client personal computer (PC), a Web site or other portal accessed using User A's cellular or PCS phone, a visit by User A at the merchant's store, or other avenues (e.g., User A's wireless carrier or a social networking Web site), as discussed above. User A can employ methods such as, without limitation, SMS, MMS, WAP (a microbrowser on a mobile device), or voice (in person or over the phone) to initiate a gift-card purchase for User B. In general, User A simply needs a way to communicate, directly or indirectly, with server 300. The foregoing example of User A purchasing a mobile gift card for User B will be referred to frequently in the description of FIGS. 4-7 that follows.

Figure 4:
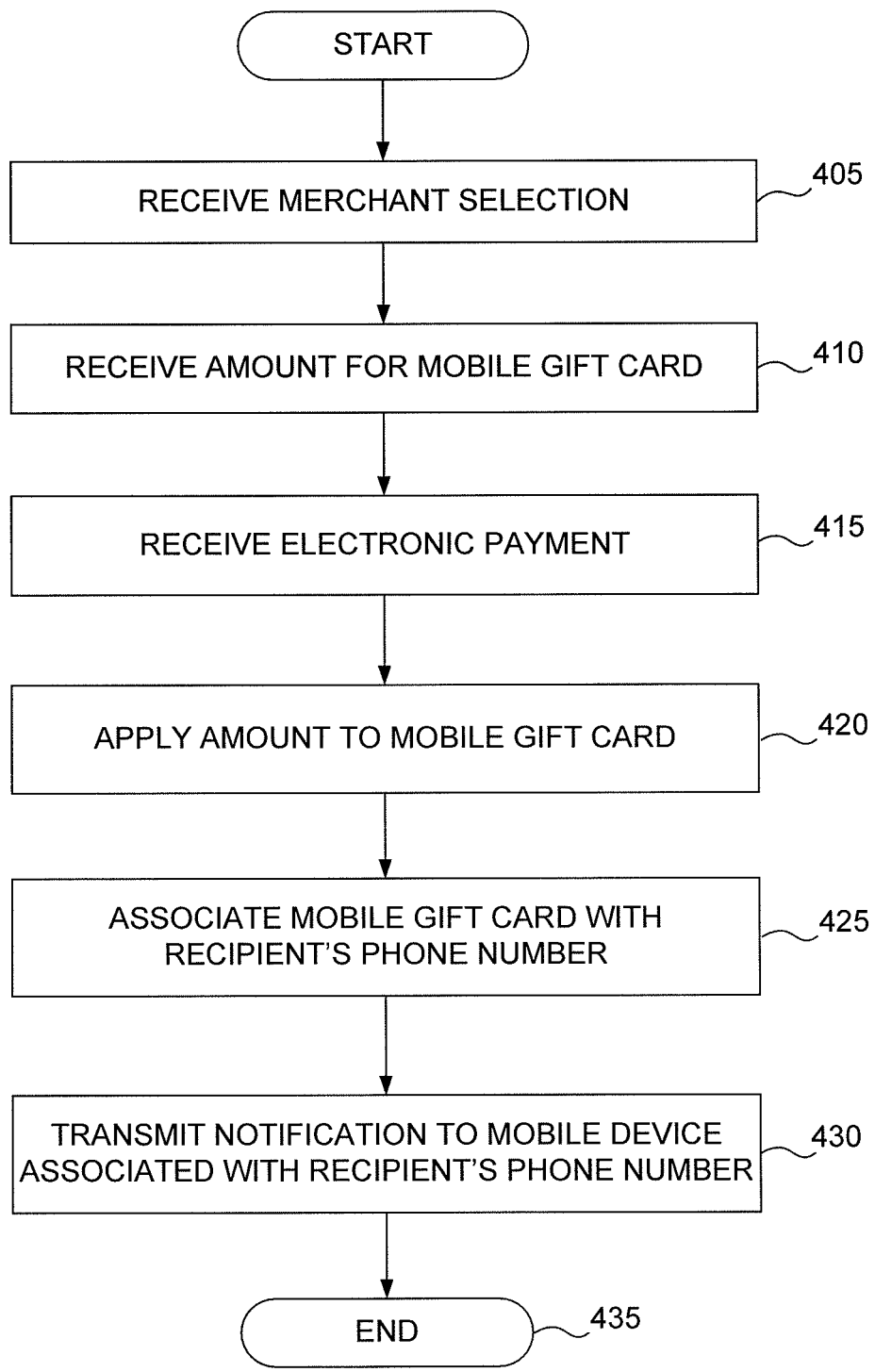
FIG. 4 is a flowchart of a method for distributing a mobile gift card in accordance with an illustrative embodiment of the invention.

FIG. 4 is a flowchart of a method for distributing a mobile gift card in accordance with an illustrative embodiment of the invention. At 405, mobile gift card management platform 340 receives, from User A, a selection of a merchant with which to associate a new mobile gift card. As discussed above, User A's selection of a merchant may be from a list provided by an aggregated distributor 105 that markets mobile gift cards for a variety of different merchants, or User A may purchase the gift card from a source that sells only the particular merchant's gift cards (e.g., the merchant's Web site or store).

At 410, mobile gift card management platform 340 receives, from User A, an indication of the monetary amount for the mobile gift card to be created and distributed, and, at 415, receives an electronic payment for that amount from User A.

At 420, mobile gift card management platform 340 applies the specified amount to the mobile gift card and, at 425, associates the mobile gift card with User B's (the recipient's) phone number (provided by User A).

At 430, mobile gift card management platform 340 transmits or otherwise conveys a notification regarding the mobile gift card to a mobile device (e.g., a cellular or PCS phone) associated with User B's (the recipient's) phone number provided by User A above in Block 425.

The notification transmitted at 430 may be accomplished in a variety of ways, including, without limitation, an SMS message, an MMS message, a voice message, or an application. The application, in some embodiments, is a WAP browser or other type of Internet browser running on the mobile-gift-card recipient's mobile device. In other embodiments, the application is a specialized application other than a browser.

In some embodiments, the notification to the recipient includes a personalized message created by User A such as, "Happy birthday, Amy! I've sent you a mobile gift card for JC PENNY. Enjoy! Marsha."

Following receipt of the mobile gift card, User B can, after proper activation with mobile gift card management platform 340, use the mobile gift card to purchase goods or services from the merchant associated with the mobile gift card in a variety of different ways, as explained above (see discussion of secure payments in connection with FIG. 2 above).

Activation can also take different forms, depending on the particular embodiment. In some embodiments, for example, the notification User B receives includes instructions to User B for how to activate the mobile gift card. For example, the notification may be an SMS message stating, "Bob, you've received a $100 mobile gift card for SPORTS AUTHORITY. Please visit mocapay.com to activate your mobile gift card." Note that, in such embodiments, the notification includes a hyperlinked Uniform Resource Locator (URL) for User B to follow to complete the activation process. Alternatively, User B could be provided with a phone number, an e-mail address, or other contact information for accomplishing activation. When User B contacts mobile commerce platform 205 to activate the mobile gift card, User B is directed to create an account, if User B does not already have one. Mobile commerce platform 205 guides User B through this straightforward process.

In another embodiment, if User B already has an account with mobile commerce platform 205, the mobile gift card is activated automatically when the notification is transmitted to User B, which makes the mobile gift card available to User B immediately upon receipt of the notification. To spend the mobile gift card, User B communicates with the server-side digital wallet supported by mobile gift card management platform 340 in the manner described above in connection with FIG. 2.

At 435, the method in FIG. 4 terminates.

Figure 5:
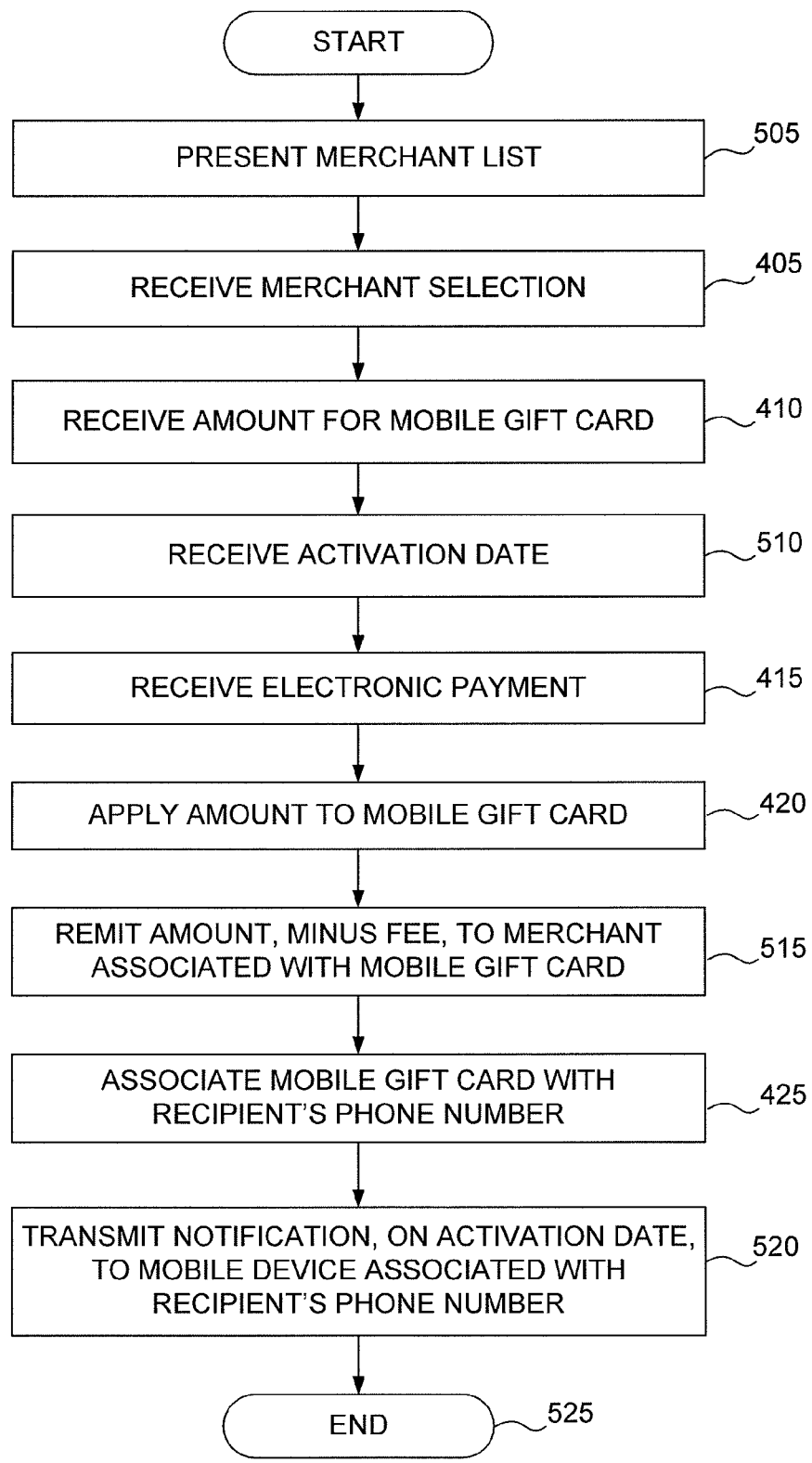
FIG. 5 is a flowchart of a method for distributing a mobile gift card in accordance with another illustrative embodiment of the invention.

FIG. 5 is a flowchart of a method for distributing a mobile gift card in accordance with another illustrative embodiment of the invention. The method in FIG. 5 is similar to that shown in FIG. 4. This embodiment presumes that User A purchases the mobile gift card from an aggregated distributor 105 (an entity offering mobile gift cards from multiple merchants). At 505, mobile gift card management platform 340 (or a separate aggregated distribution system that communicates with server 300) presents User A with an aggregated list of available merchants from which to purchase a mobile gift card. As noted in connection with FIG. 4, mobile gift card management platform 340 receives, at 405, a selection from User A of a particular merchant.

At 510, mobile gift card management platform 340 receives a specific activation date from User A (the party purchasing the mobile gift card). For example, if User B's birthday is still five days in the future, User A would like to postpone notification of the mobile gift card until User B's birthday. In such an embodiment, notification of the mobile gift card is conveyed to User B on the activation date specified by User A.

At 515, mobile gift card management platform 340 causes the amount of the mobile gift card purchased by User A, minus a predetermined fee that goes to merchant's agent 110, to be remitted to the applicable merchant associated with the mobile gift card. Payment of the merchant is accomplished via the settlement process mentioned above in connection with FIG. 2.

Block 520 includes the modification mentioned above that the notification of the mobile gift card to User B is conveyed to User B's mobile device on the activation date specified by User A. At 525, the method terminates.

In some embodiments, the purchaser of a mobile gift card and the recipient of that mobile gift card may be one and the same person. That is, a user may, instead of purchasing a mobile gift card for another person, purchase a mobile gift card for himself or herself.

Figure 6:
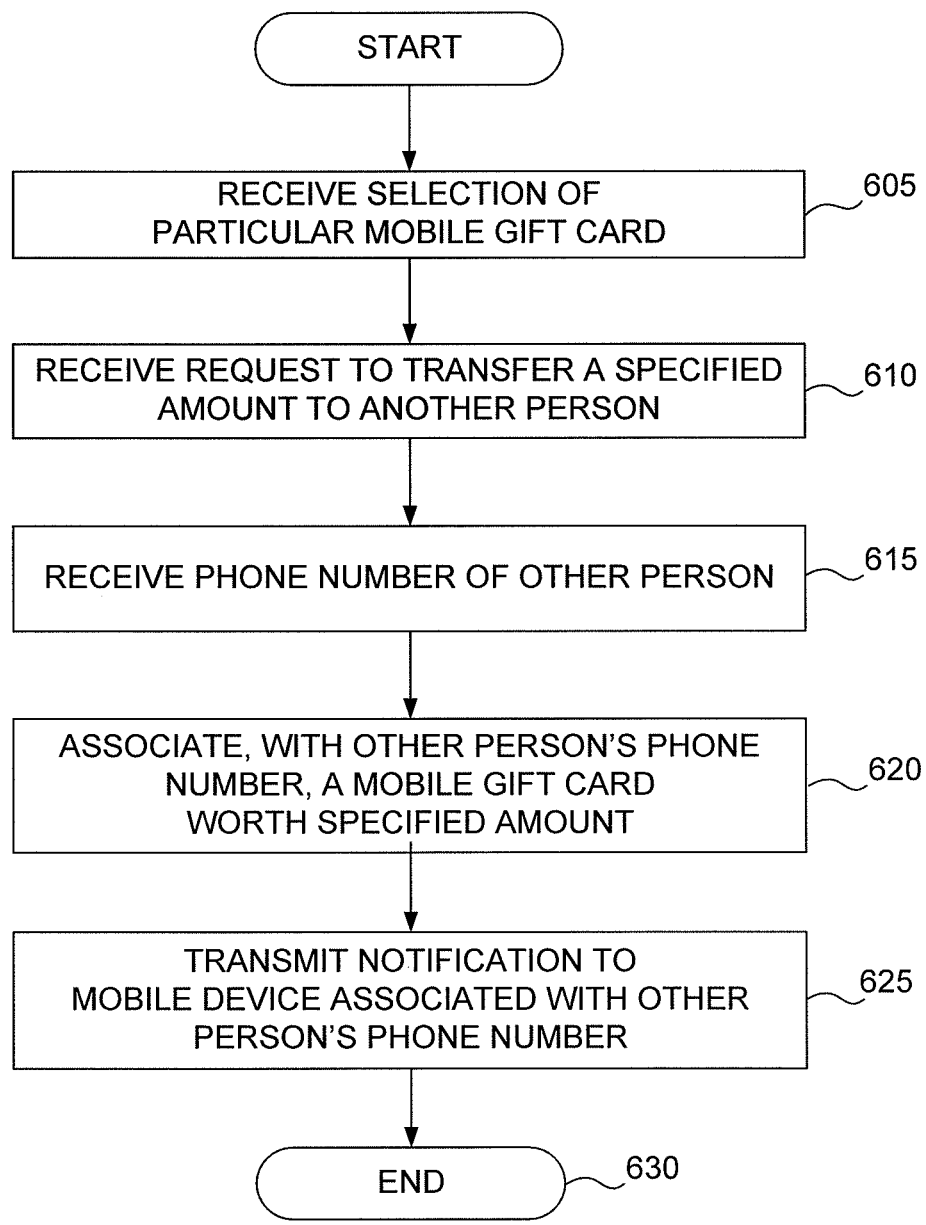
FIG. 6 is a flowchart of a method for transferring a mobile gift card from one user to another in accordance with an illustrative embodiment of the invention.
Figure 7:
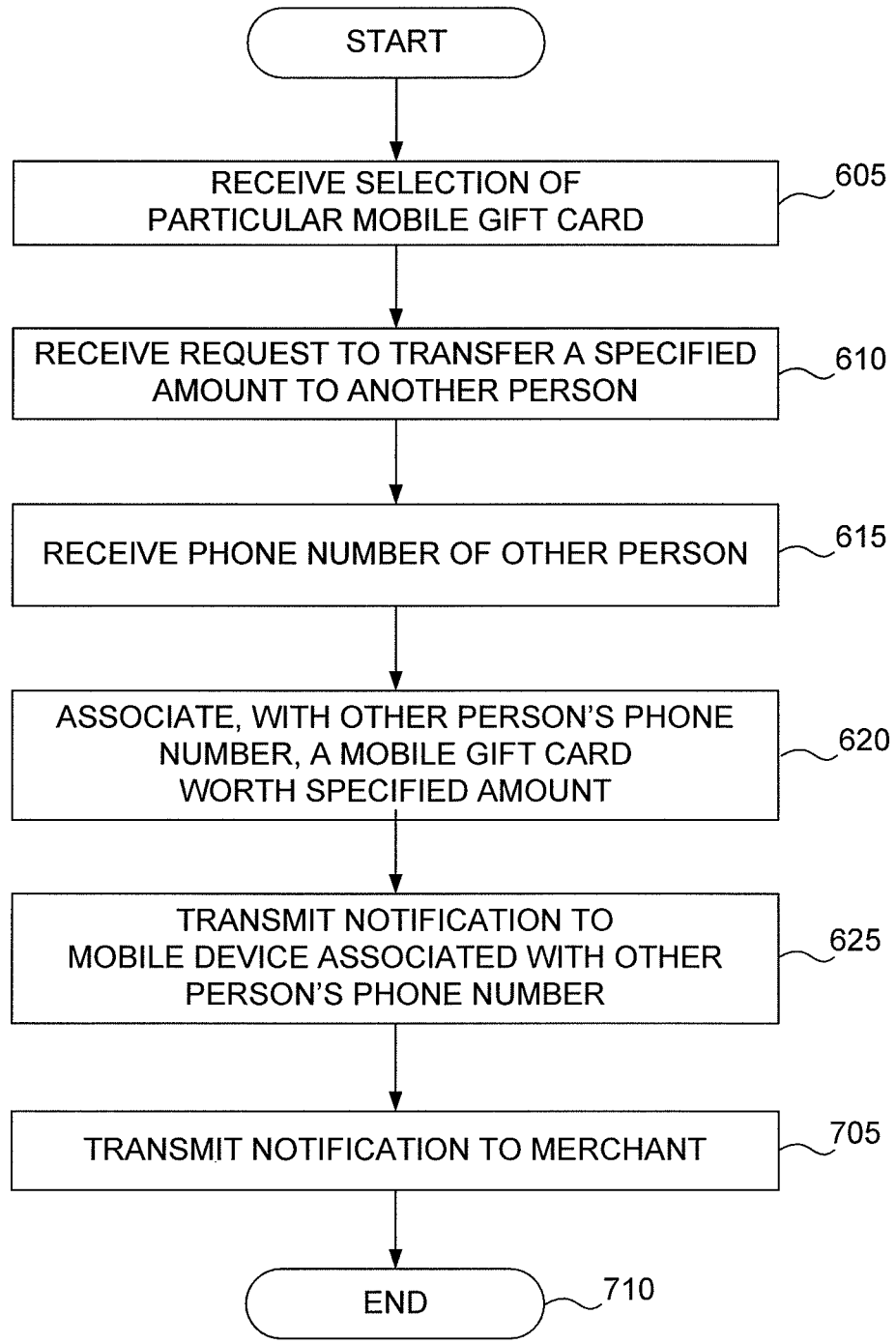
FIG. 7 is a flowchart of a method for transferring a mobile gift card from one user to another in accordance with another illustrative embodiment of the invention.

FIG. 6 is a flowchart of a method for transferring a mobile gift card from one user to another in accordance with an illustrative embodiment of the invention. In the discussion of FIGS. 6 and 7 below, use of the terminology "User A" and "User B" to identify distinct persons is continued. In FIGS. 6 and 7, it is assumed that User A has purchased a mobile gift card for User B and that User B has activated that mobile gift card (or that it was automatically activated). It is also assumed that User B wishes to transfer all or a portion of the balance of the mobile gift card to a third user, User C.

At 605, User B communicates with mobile gift card management platform 340 via any of the methods mentioned above (e.g., SMS, MMS, WAP, application, voice) or any others that might be applicable in a particular embodiment, and mobile gift card management platform 340 receives a selection of a particular mobile gift card from among those in User B's server-side digital wallet. For example, User B might contact mobile gift card management platform 340 using a cellular phone equipped with a WAP browser and view a list of available gift cards and their balances. At 610, mobile gift card management platform 340 receives a request from User B to transfer all or a portion of the selected mobile gift card to another person (User C).

At 615, mobile gift card management platform 340 receives, from User B, a phone number associated with User C. At 620, mobile gift card management platform 340 associates, with User C's phone number, a mobile gift card in the amount of the transfer specified by User B at Block 610. The transferred mobile gift card belonging to User C has the same merchant associated with it as the original mobile gift card belonging to User B.

At 625, mobile gift card management platform 340 transmits or otherwise conveys a notification of User C's new mobile gift card to a mobile device associated with User C's (the recipient's) phone number. At 630, the method terminates.

Note that, in some embodiments, where User B transfers the entire remaining balance of a mobile gift card to User C, it is not necessary for mobile gift card management platform 340 to create a separate mobile gift card for User C. In that case, the existing mobile gift card can simply be remapped from an association with User B's phone number to an association with User C's phone number, effectively deleting that mobile gift card from User B's account. Where User B elects to transfer less than the entire remaining balance, however, User B continues to hold the original mobile gift card with its remaining balance, and a new, separate mobile gift card in the amount of the transfer is created for User C.

Note that this ability to "re-gift" mobile gift cards as described above essentially puts User B in the position of being a mobile gift card distributor 105, and User C can do likewise, and so on. Once created, the separate mobile gift cards, in this illustrative embodiment, are completely independent of each other.

In the case of a mobile gift card that a user receives through a transfer from another user, all of the same options and features described above regarding notification (e.g., personalization), activation, and use (payments) apply equally to such a transferred mobile gift card.

FIG. 7 is a flowchart of a method for transferring a mobile gift card from one user to another in accordance with another illustrative embodiment of the invention. The method shown in FIG. 7 is similar to that in FIG. 6. In this embodiment, however, mobile gift card management platform 340, in connection with a transfer of all or a portion of a mobile gift card from one user to another, transmits or otherwise conveys notification of the transfer and, where applicable, the existence of the new mobile gift card belonging to User C, to the merchant associated with the mobile gift card. A partial transfer is advantageous to the issuing merchant because, if the transfer was only partial and not complete, the merchant can now expect an additional customer (User C) to visit its store. At 710, the method terminates.

Figure 8:
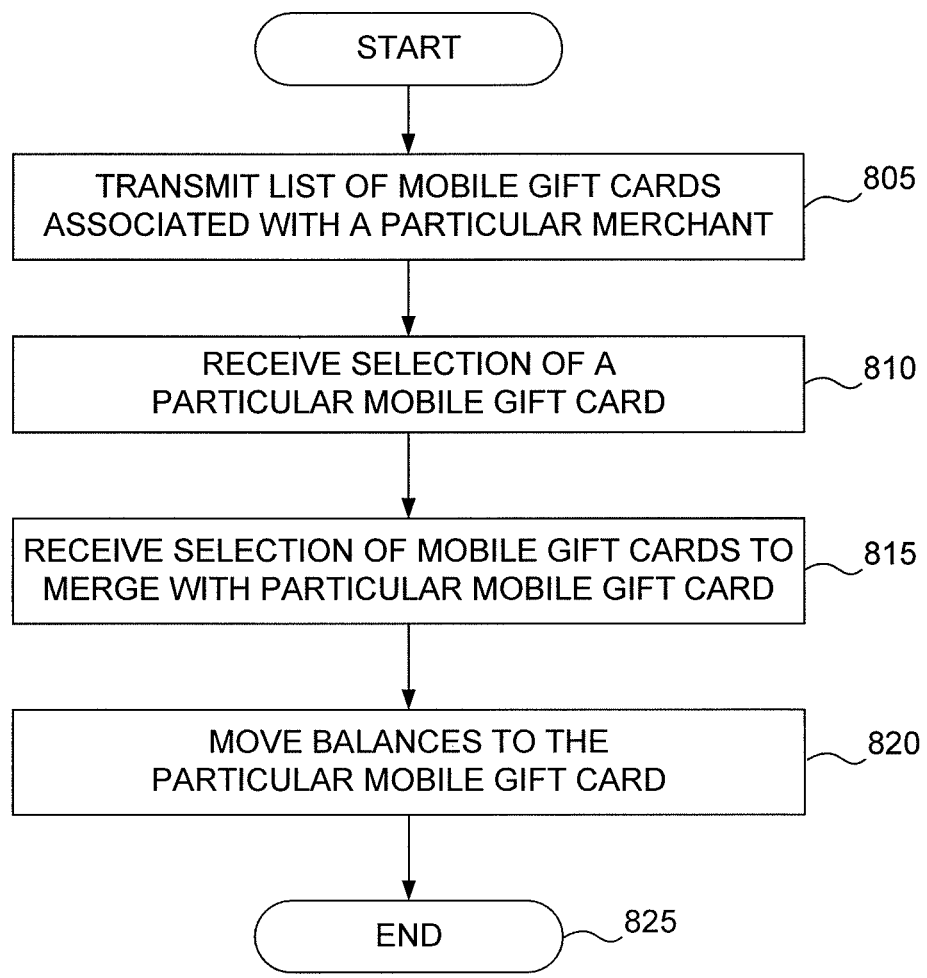
FIG. 8 is a flowchart of a method for merging mobile gift cards in accordance with an illustrative embodiment of the invention.

FIG. 8 is a flowchart of a method for merging mobile gift cards in accordance with an illustrative embodiment of the invention. In some cases, a mobile user 220 may end up with multiple mobile gift cards associated with the same merchant 225 in his or her account on mobile gift card management platform 340. Such a user may desire to consolidate (merge) some or all of those mobile gift cards into fewer or a single mobile gift card associated with that merchant.

At 805, mobile gift card management platform 340 transmits to the user's mobile device 130 a list of the mobile gift cards associated with a particular merchant 225 that belong to the user 220. For example, the user's mobile device 130 may display a list of all of the mobile gift cards for BEST BUY that are available to the user 220 in his or her server-side digital wallet. In some embodiments, the list is transmitted in response to a request received from the user's mobile device 130. In other embodiments, the list may be presented to the user 220 in another context while the user 220 is managing his or her mobile gift cards or other tenders on mobile device 130. This may, in some embodiments, include a prompt on mobile device 130 asking the user 220 if he or she wishes to merge multiple mobile gift cards associated with the same merchant 225 into fewer or a single mobile gift card.

At 810, mobile gift card management platform 340 receives from the user 220 via mobile device 130 a selection of a particular mobile gift card among the list of mobile gift cards transmitted at 805. This selected particular mobile gift card may be termed, for convenience of description, a "target" mobile gift card with which one or more other mobile gift cards in the list are to be merged. That is, the target mobile gift card is the mobile gift card that receives the remaining monetary balance of one or more other mobile gift cards in the list.

At 815, mobile gift card management platform 340 receives from the user 220 via mobile device 130 a selection of one or more mobile gift cards in the list other than the target mobile gift card to merge with the target mobile gift card. In making this selection, the user 220 may select all or only a subset of the other mobile gift cards in the list transmitted at 805.

At 820, mobile gift card management platform 340 moves the remaining monetary balance of each of the mobile gift cards selected at 815 to the target mobile gift card selected at 810. In some embodiments, mobile gift card management platform 340 communicates with gift card system 210 to execute one or more balance-transfer transactions, each such transaction causing the remaining monetary balance on one of the mobile gift cards selected at 815 to be transferred to the target mobile gift card selected at 810.

In other embodiments, mobile gift card management platform 340 communicates with gift card system 210 to perform a sale transaction on each mobile gift card to be merged with the target mobile gift card. Each such sale transaction is in an amount equal to the remaining monetary balance on the applicable mobile gift card. In these embodiments, mobile gift card management platform 340 also communicates with gift card system 210 to perform, for each mobile gift card being merged (eliminated), a corresponding credit transaction on the target mobile gift card. Each such credit transaction credits, to the target mobile gift card, the amount of the sale transaction that was performed on the applicable mobile gift card being merged. Either implementation—that using balance-transfer transactions or that using in-tandem sale and credit transactions—accomplishes the same objective—that of moving the remaining monetary balances of the mobile gift cards selected at 815 to the mobile gift card selected at 810.

At 825, the method terminates. User 220 may use the resulting merged/consolidated mobile gift card (the target mobile gift card selected at 810) in commerce like any other mobile gift card, as described above. The resulting merged mobile gift card has a monetary balance equal to the combined monetary balances of the target mobile gift card selected at 810 and those selected for merging at 815.

In some embodiments, mobile gift card management platform 340 deletes from the user's account the mobile gift cards selected for merging at 815 after they have been merged with the target mobile gift card. This eliminates zero-balance (useless) mobile gift cards from the user's account, reducing clutter. Such deletion may be automatic, or it may be performed in response to a request from the user 220 via mobile device 130.

Figure 9:
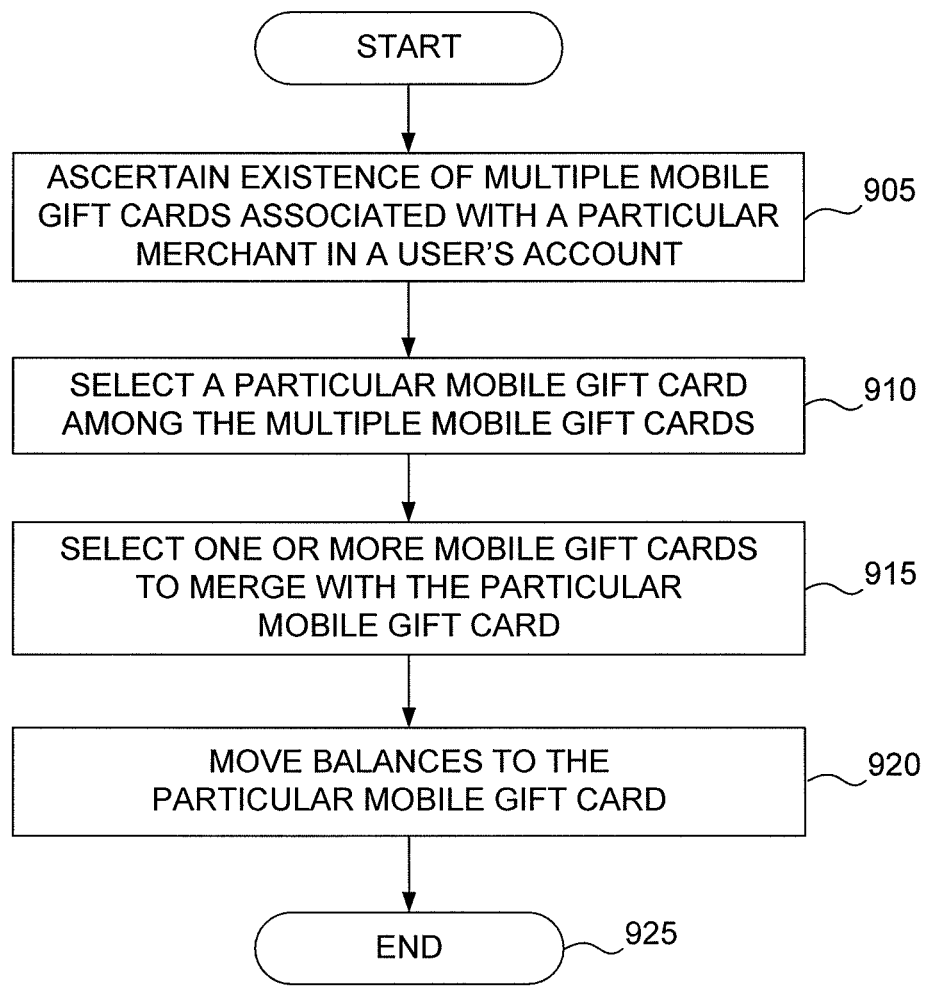
FIG. 9 is a flowchart of a method for merging mobile gift cards in accordance with another illustrative embodiment of the invention.

FIG. 9 is a flowchart of a method for merging mobile gift cards in accordance with another illustrative embodiment of the invention. In this embodiment, the consolidation/merging process is automated in mobile gift card management platform 340 rather than being guided manually by the user 220. At 905, mobile gift card management platform 340 automatically ascertains the existence, in a user's account, of multiple mobile gift cards associated with a particular merchant 225. At 910, mobile gift card management platform 340 automatically selects a particular mobile gift card among those mobile gift cards as a target mobile gift card with which to merge one or more of the other mobile gift cards associated with the particular merchant 225. The particular mobile gift card selected as the target is arbitrary. In one embodiment, the mobile gift card with the largest remaining balance among those associated with the particular merchant 225 is automatically selected as the target.

At 915, mobile gift card management platform 340 automatically selects one or more mobile gift cards other than the target mobile gift card to merge with the target mobile gift card selected at 910. In some embodiments, all of the other mobile gift cards associated with the particular merchant 225 are merged with the target mobile gift card so that only one mobile gift card associated with that merchant 225 remains in the user's account after the merge. In other embodiments, only a subset of the other mobile gift cards are merged with the target mobile gift card so that multiple mobile gift cards associated with the particular merchant 225 remain in the user's account after the merge.

At 920, mobile gift card management platform 340 automatically moves the remaining monetary balance of each of the mobile gift cards selected at 915 to the target mobile gift card. This can be accomplished, for example, using the techniques described above in connection with FIG. 8 (e.g., a balance-transfer transaction or in-tandem sale and credit transactions for each mobile gift card being merged with the target mobile gift card).

Optionally, mobile gift card management platform 340 may notify the user of the merge operation via the user's mobile device 130. Such notification could include mention of the merchant, the target mobile gift card, identification of the mobile gift cards that were merged with the target mobile gift card, and the resulting balance on the target mobile gift card. Automatic merging of multiple gift cards from the same merchant into a single mobile gift card is, in some embodiments, a user preference that the user 220 can set via his or her mobile device 130.

At 925, the method terminates.

As with the method discussed above in connection with FIG. 8, user 220 may use the resulting merged mobile gift card (the target mobile gift card selected at 910) in commerce like any other mobile gift card, as described above. The resulting merged mobile gift card has a monetary balance equal to the combined monetary balances of the target mobile gift card selected at 910 and those selected for merging at 915. Also, as with the method discussed above in connection with FIG. 8, the merged mobile gift cards, now with zero balances, may be deleted from the user's account after the merge operation.

In conclusion, the present invention provides, among other things, a method and system for merging mobile gift cards. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims. For example, though the above description implies that the selection of a target mobile gift card (see Blocks 810 and 910 in FIGS. 8 and 9, respectively) occurs prior to selection of one or more mobile gift cards to merge therewith (see Blocks 815 and 915 in FIGS. 8 and 9, respectively), this is not necessarily the case in all embodiments. In some embodiments, these steps are performed in the opposite order. That is, the mobile gift cards to be merged with another (as-yet-unspecified) mobile gift card are selected first by the user 220 or mobile gift card management platform 340, depending on the particular embodiment, and then the target mobile gift card with which they are to be merged is selected. The process of moving the remaining monetary balances of the other selected mobile gift cards to the target mobile gift card is unaffected by the order in which the target and the other mobile gift cards are selected.

What is claimed is:

1. A computer-server-based method for merging mobile gift cards, the computer server-based method comprising:
   transmitting to a mobile device associated with a user from a computer server a list of a plurality of mobile gift cards associated with a particular merchant that belong to the user;
   receiving at the computer server from the user via the mobile device a selection of a particular one of the plurality of mobile gift cards associated with the particular merchant;
   receiving at the computer server from the user via the mobile device a selection of one or more mobile gift cards in the plurality of mobile gift cards other than the particular one of the plurality of mobile gift cards to merge with the particular one of the plurality of mobile gift cards; and moving with the computer server a remaining monetary balance of each of the selected one or more mobile gift cards in the plurality of mobile gift cards other than the particular one of the plurality of mobile gift cards to the particular one of the plurality of mobile gift cards; and storing an account number associated with the particular one of the plurality of mobile gift cards at the computer server instead of at the mobile device such that the computer server communicates with the mobile device to conduct secure purchases using the particular one of the plurality of mobile gift cards on behalf of the recipient.

2. The computer-server-based method of claim 1, wherein the selected one or more mobile gift cards in the plurality of mobile gift cards other than the particular one of the plurality of mobile gift cards are deleted from the user's account after their remaining monetary balances have been moved to the particular one of the plurality of mobile gift cards.

3. The computer-server-based method of claim 1, wherein the moving includes, for each of the selected one or more mobile gift cards in the plurality of mobile gift cards other than the particular one of the plurality of mobile gift cards, communicating with a gift card system to perform a balance-transfer transaction that causes the remaining monetary balance of that mobile gift card to be transferred to the particular one of the plurality of mobile gift cards.

4. The computer-server-based method of claim 1, wherein the moving includes, for each of the selected one or more mobile gift cards in the plurality of mobile gift cards other than the particular one of the plurality of mobile gift cards:
communicating with a gift card system to perform a sale transaction on that mobile gift card in an amount corresponding to the remaining monetary balance on that mobile gift card; and
communicating with the gift card system to perform a credit transaction that credits, to the particular one of the plurality of mobile gift cards, the amount of the sale transaction.

5. A system implemented by at least one computer server for merging mobile gift cards, the system comprising:
at least one processor; and
a memory containing a plurality of program instructions executable by the at least one processor, the plurality of program instructions being configured to cause the at least one processor to:
transmit to a mobile device associated with a user a list of a plurality of mobile gift cards associated with a particular merchant that belong to the user;
receive from the user via the mobile device a selection of a particular one of the plurality of mobile gift cards associated with the particular merchant;
receive from the user via the mobile device a selection of one or more mobile gift cards in the plurality of mobile gift cards other than the particular one of the plurality of mobile gift cards to merge with the particular one of the plurality of mobile gift cards; and
move a remaining monetary balance of each of the selected one or more mobile gift cards in the plurality of mobile gift cards other than the particular one of the plurality of mobile gift cards to the particular one of the plurality of mobile gift cards; and
store an account number associated with the particular one of the plurality of mobile gift cards at the computer server instead of at the mobile device such that the computer server communicates with the mobile device to conduct secure purchases using the particular one of the plurality of mobile gift cards on behalf of the recipient.

6. The system of claim 5, wherein the plurality of program instructions are configured to cause the at least one processor to delete from the user's account the selected one or more mobile gift cards in the plurality of mobile gift cards other than the particular one of the plurality of mobile gift cards after their remaining monetary balances have been moved to the particular one of the plurality of mobile gift cards.

7. The system of claim 5, wherein the plurality of program instructions are configured to cause the at least one processor, for each of the selected one or more mobile gift cards in the plurality of mobile gift cards other than the particular one of the plurality of mobile gift cards, to communicate with a gift card system to perform a balance-transfer transaction that causes the remaining monetary balance of that mobile gift card to be transferred to the particular one of the plurality of mobile gift cards.

8. The system of claim 5, wherein the plurality of program instructions are configured to cause the at least one processor, for each of the selected one or more mobile gift cards in the plurality of mobile gift cards other than the particular one of the plurality of mobile gift cards, to:
communicate with a gift card system to perform a sale transaction on that mobile gift card in an amount corresponding to the remaining monetary balance on that mobile gift card; and
communicate with the gift card system to perform a credit transaction that credits, to the particular one of the plurality of mobile gift cards, the amount of the sale transaction.

9. A computer-server-based method for merging mobile gift cards, the computer server-based method comprising:
ascertaining automatically at a computer server that a mobile-payments account associated with a user includes a plurality of mobile gift cards associated with a particular merchant;
selecting automatically at the computer server a particular one of the plurality of mobile gift cards associated with the particular merchant;
selecting automatically at the computer server one or more mobile gift cards in the plurality of mobile gift cards other than the particular one of the plurality of mobile gift cards to merge with the particular one of the plurality of mobile gift cards; and
moving automatically with the computer server a remaining monetary balance of each of the selected one or more mobile gift cards in the plurality of mobile gift cards other than the particular one of the plurality of mobile gift cards to the particular one of the plurality of mobile giftcards; and
storing an account number associated with the particular one of the plurality of mobile gift cards at the computer server instead of at the mobile device such that the computer server communicates with the mobile device to conduct secure purchases using the particular one of the plurality of mobile gift cards on behalf of the recipient.

10. The computer-server-based method of claim 9, wherein the selected one or more mobile gift cards in the plurality of mobile gift cards other than the particular one of the plurality of mobile gift cards are deleted from the user's account after their remaining monetary balances have been moved to the particular one of the plurality of mobile gift cards.

11. The computer-server-based method of claim 9, wherein the moving includes, for each of the selected one or more mobile gift cards in the plurality of mobile gift cards other than the particular one of the plurality of mobile gift cards, communicating with a gift card system to perform a balance-transfer transaction that causes the remaining monetary balance of that mobile gift card to be transferred to the particular one of the plurality of mobile gift cards.

12. The computer-server-based method of claim 9, wherein the moving includes, for each of the selected one or more mobile gift cards in the plurality of mobile gift cards other than the particular one of the plurality of mobile gift cards:
communicating with a gift card system to perform a sale transaction on that mobile gift card in an amount corresponding to the remaining monetary balance on that mobile gift card; and
communicating with the gift card system to perform a credit transaction that credits, to the particular one of the plurality of mobile gift cards, the amount of the sale transaction.

13. The computer-server-based method of claim 9, wherein the automatic selection of one or more mobile gift cards in the plurality of mobile gift cards other than the particular one of the plurality of mobile gift cards encompasses all of the mobile gift cards in the plurality of mobile gift cards other than the particular one of the plurality of mobile gift cards.

14. The computer-server-based method of claim 9, further comprising:
notifying the user via a mobile device associated with the user that the selected one or more mobile gift cards in the plurality of mobile gift cards other than the particular one of the plurality of mobile gift cards have been merged into the particular one of the plurality of mobile gift cards.

15. The computer-server-based method of claim 9, wherein a mobile gift card in the plurality of mobile gift cards having the largest remaining monetary balance among the mobile gift cards in the plurality of mobile gift cards is automatically selected as the particular one of the plurality of mobile gift cards.

16. A system implemented by at least one computer server for merging mobile gift cards, the system comprising:
at least one processor; and
a memory containing a plurality of program instructions executable by the at least one processor, the plurality of program instructions being configured to cause the at least one processor to:
ascertain automatically that a mobile-payments account associated with a user includes a plurality of mobile gift cards associated with a particular merchant;
select automatically a particular one of the plurality of mobile gift cards associated with the particular merchant;
select automatically one or more mobile gift cards in the plurality of mobile gift cards other than the particular one of the plurality of mobile gift cards to merge with the particular one of the plurality of mobile gift cards; and
move automatically a remaining monetary balance of each of the selected one or more mobile gift cards in the plurality of mobile gift cards other than the particular one of the plurality of mobile gift cards to the particular one of the plurality of mobile gift cards; and
store an account number associated with the particular one of the plurality of mobile gift cards at the computer server instead of at the mobile device such that the computer server communicates with the mobile device to conduct secure purchases using the particular one of the plurality of mobile gift cards on behalf of the recipient.

17. The system of claim 16, wherein the plurality of program instructions are configured to cause the at least one processor to delete from the user's account the selected one or more mobile gift cards in the plurality of mobile gift cards other than the particular one of the plurality of mobile gift cards after their remaining monetary balances have been moved to the particular one of the plurality of mobile gift cards.

18. The system of claim 16, wherein the plurality of program instructions are configured to cause the at least one processor, for each of the selected one or more mobile gift cards in the plurality of mobile gift cards other than the particular one of the plurality of mobile gift cards, to communicate with a gift card system to perform a balance-transfer transaction that causes the remaining monetary balance of that mobile gift card to be transferred to the particular one of the plurality of mobile gift cards.

19. The system of claim 16, wherein the plurality of program instructions are configured to cause the at least one processor, for each of the selected one or more mobile gift cards in the plurality of mobile gift cards other than the particular one of the plurality of mobile gift cards, to:
communicate with a gift card system to perform a sale transaction on that mobile gift card in an amount corresponding to the remaining monetary balance on that mobile gift card; and
communicate with the gift card system to perform a credit transaction that credits, to the particular one of the plurality of mobile gift cards, the amount of the sale transaction.

20. The system of claim 16, wherein the plurality of program instructions are configured to cause the at least one processor, in selecting one or more mobile gift cards other than the particular one of the plurality of mobile gift cards to merge with the particular one of the plurality of mobile gift cards, to select all of the mobile gift cards in the plurality of mobile gift cards other than the particular one of the plurality of mobile gift cards.

21. The system of claim 16, wherein the plurality of program instructions are configured to cause the at least one processor to notify the user via a mobile device associated with the user that the selected one or more mobile gift cards in the plurality of mobile gift cards other than the particular one of the plurality of mobile gift cards have been merged into the particular one of the plurality of mobile gift cards.

22. The system of claim 16, wherein a mobile gift card in the plurality of mobile gift cards having the largest remaining monetary balance among the mobile gift cards in the plurality of mobile gift cards is automatically selected as the particular one of the plurality of mobile gift cards.

* * * * *